J. H. WESSON.
VEHICLE BRAKE.
APPLICATION FILED JUNE 30, 1908.
925,543.
Patented June 22, 1909.
2 SHEETS—SHEET 1.
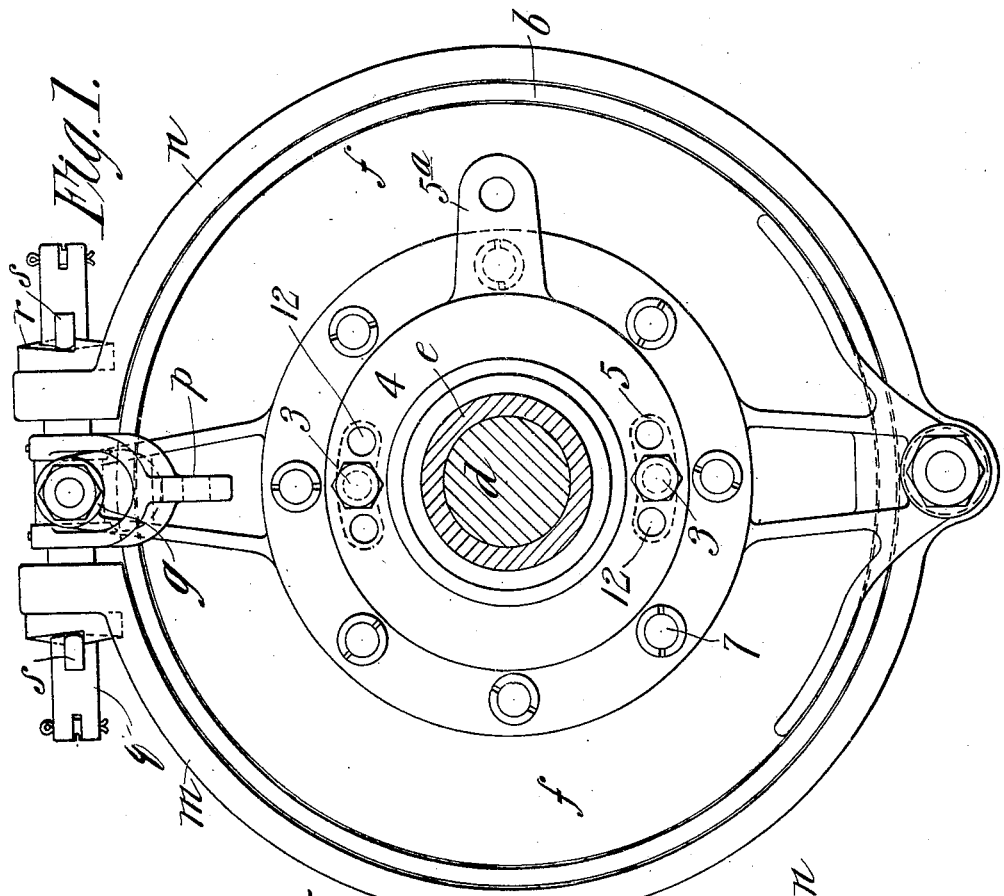
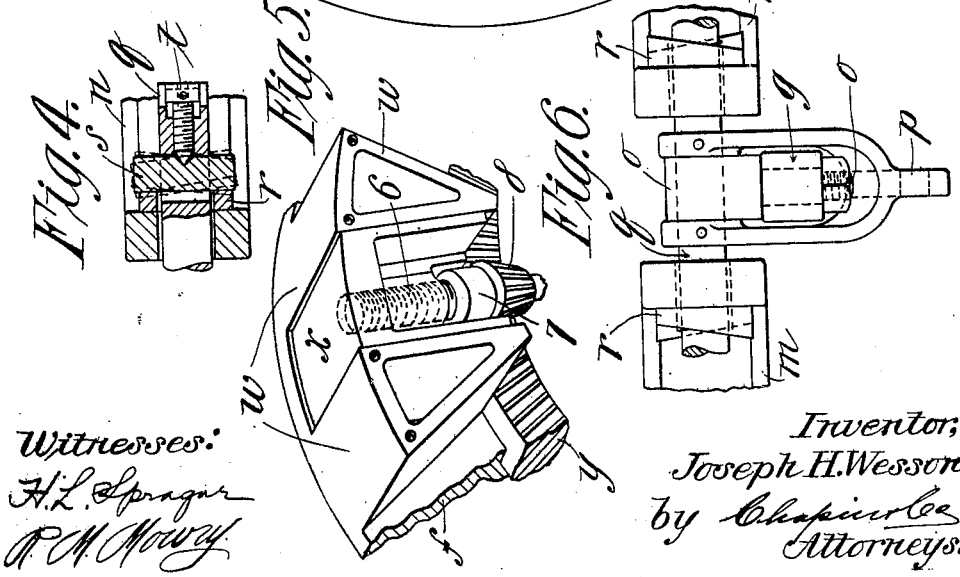
Witnesses:
Inventor;
Joseph H. Wesson,
by Chapin & Lee
Attorneys.

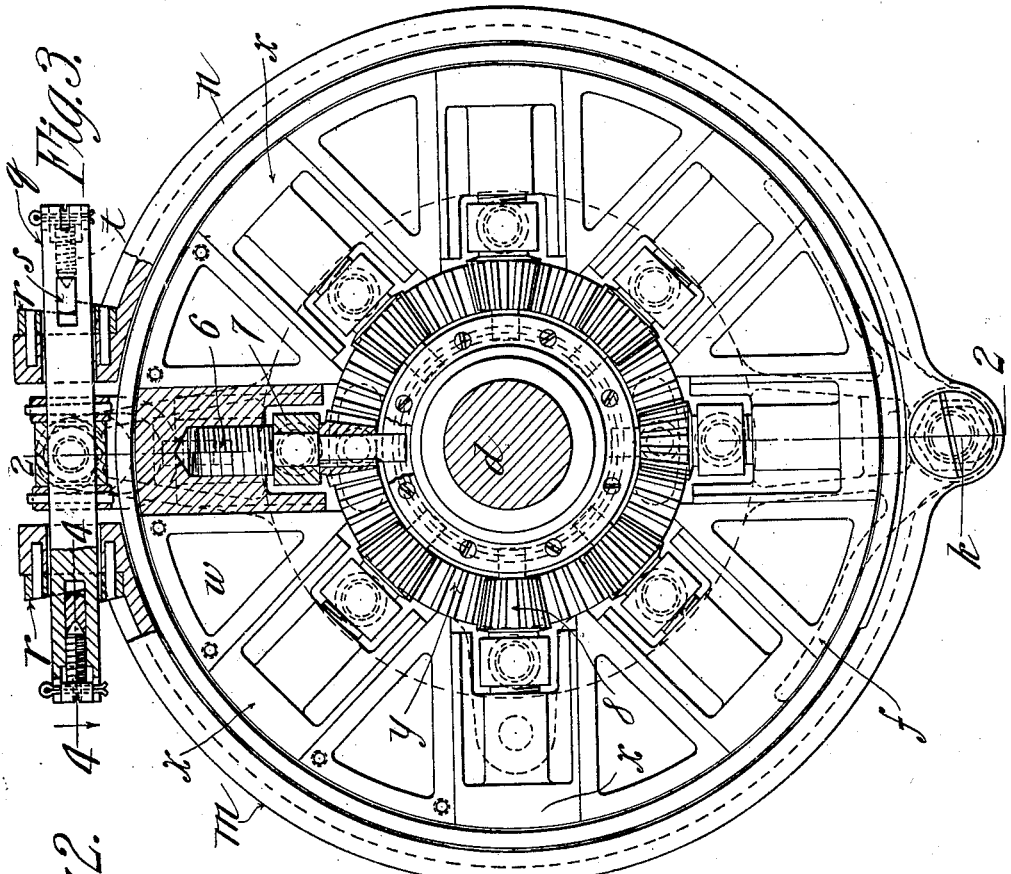
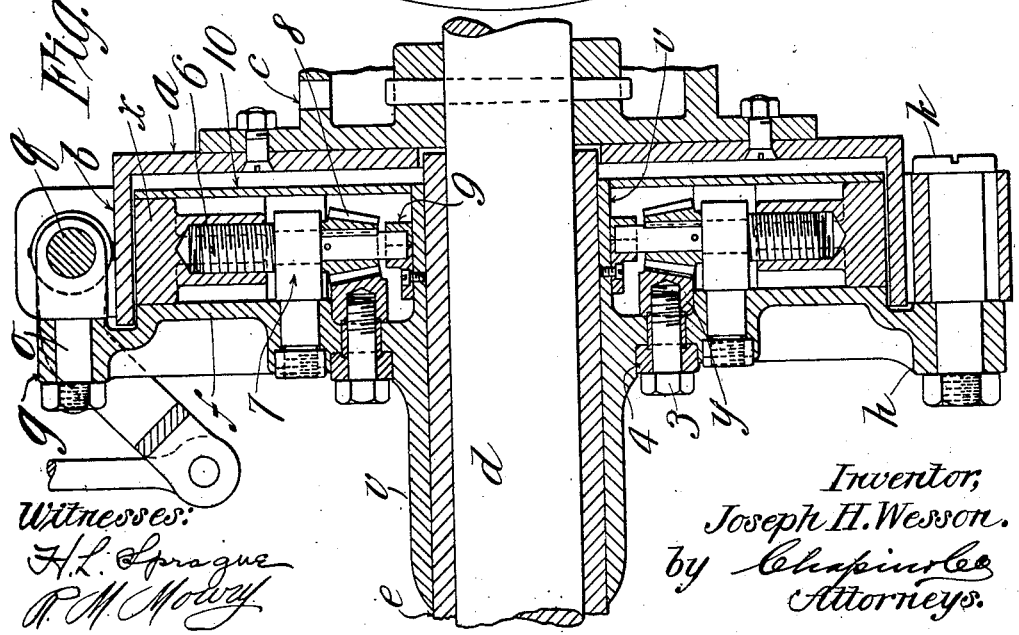

UNITED STATES PATENT OFFICE.

JOSEPH H. WESSON, OF SPRINGFIELD, MASSACHUSETTS.

VEHICLE-BRAKE.

No. 925,543.

Specification of Letters Patent.

Patented June 22, 1909.

Application filed June 30, 1908. Serial No. 441,191.

*To all whom it may concern:*

Be it known that I, JOSEPH HAWES WESSON, a citizen of the United States of America, residing at Springfield, in the county of Hampden and State of Massachusetts, have invented new and useful Improvements in Vehicle-Brakes, of which the following is a specification.

This invention relates to vehicle brakes and especially to brakes for power-propelled vehicles, as automobiles, the object of the invention being to provide powerful, positively acting brake mechanism embodying certain novel features of construction all as fully described in the following specification and clearly pointed out in the claims, the invention being illustrated in the accompanying drawings, in which,—

Figure 1 is a side elevation of the brake mechanism in which this invention is embodied in its preferred form. Fig. 2 is a sectional elevation of the brake mechanism on line 2—2, Fig. 3. Fig. 3 is a side elevation of the mechanism, as shown in Fig. 1, but with the drum and a circular retaining plate removed to more clearly show the principal moving parts of the mechanism, certain parts being in section. Fig. 4 is a sectional plan view on line 4—4, Fig. 3, showing the construction of the adjusting means for the external band-brake. Fig. 5 is a perspective view of a portion of the brake mechanism showing the construction and arrangement of the radially acting brake-blocks which are moved out against the inner surface of the flanged brake-drum. Fig. 6 is a plan view of the device for constricting the band-brake which is shown in side elevation at the top of Fig. 1.

Referring now to the main figures of the drawings, and particularly to Figs. 1 and 2, the brake mechanism embodying the invention consists in a brake-drum $a$ having a flange extending from one side thereof in a direction parallel to the axis of the drum, which flange is indicated by $b$. This brake-drum, in any suitable manner, may be secured to the hub of a wheel of which it may be assumed that the circular plate $c$ forms part. In this instance this plate is shown as pinned to a shaft $d$ which represents the driving axle of a vehicle rotatably supported in a stationary hollow axle $e$. Secured to this axle is the stationary brake member by means of a long hub which extends nearly through to the brake-drum whereby means of support are provided for certain mechanism to be described located between said drum and said stationary brake member. As shown in Fig. 1 particularly, this stationary brake-member consists of a circular plate $f$ provided with diametrically opposed rigid projections $g$ and $h$, the latter receiving a bolt $k$ on which the two parts $m$ and $n$ of the band-brake are pivoted and the projection $g$ serving as a support for an eye-bolt $o$ (see Fig. 6) which constitutes a spacing washer for the arm $p$ which is pinned or otherwise secured to a shaft $q$ extending through the eye-bolt and through the upturned parallel ends of the brake-bands $m$ and $n$, the opposite ends of the shaft $q$, as shown in the drawings, extending through two hardened steel disks $r$ secured to the outer surfaces of the upturned ends of the bands, which plates constitute two face cams. Extending through the shaft $q$ at right angles thereto are two cross-pieces $s$, also of hardened steel, one edge of which is arranged to bear against the face-cams $r$. It is therefore clear that if the shaft $q$ be rotated, as by the oscillation of the arm $p$, the action of the cross-pieces $s$ against the face-cams $r$ will tend to constrict the brake-bands $m$ and $n$ around the flange $b$ of the brake-drum.

Means are provided for compensating for the wear of the brake-bands as follows: The cross-bars $s$ extending through the shaft $q$ are adjustable toward the face of the cam by means of a screw $t$ (see Fig. 4) which is screwed into the end of the shaft $q$, said screw having a tapered point, preferably, entering a similarly shaped recess in the edge of the bar $s$; and to provide for the required degree of constriction of either of the bands $m$ or $n$, the screw $t$ may be turned up. This adjusting device has another function due to the pivoting of the bars $s$ on the ends of the screws $t$, in that this permits the said bars a limited swinging movement on the points of the screws so that as the parallel upturned ends of the brake-bands are drawn together and thereby moved out of parallel relation, more or less, a square bearing of these bars $s$ on the face-cams is assured.

The above described construction therefore provides a very efficient external constricting brake mechanism.

The internally expanding brake mechanism, acting against the interior periphery of the flange $b$, of the brake-drum, is constructed as follows: The stationary element of the brake mechanism is securely supported on the stationary hollow axle e, as stated above, by means of a long hub v made preferably integral with the circular plate f. Referring to Figs. 3 and 5, it is seen that on the inner surface of the plate f V-shaped projections w are formed whereby radially disposed rectangular channels are provided for the reception of the brake-blocks x. Preferably these projections w are cored out hollow, as shown. Near the hub there is mounted a circular rack y supported by bolts 3 extending through a ring 4 let into a channel on the face of the plate f, the bolts 3 extending through slots 5 in the plate f, this construction permitting rotative movement to the rack y in either direction within the limits of said slots. For the purpose of rotating said rack, an arm $5^a$ is applied to the ring 4, as shown in Fig. 1, from which a suitable connection may extend to within reach of the operator. Each of the brake-blocks x is, from its inner end outward, and about centrally thereof, provided with a screw-threaded hole to receive the threaded end of a stud 6 which is rotatably supported on an eye-bolt 7, the shank of which extends through the plate f and is provided with a nut to secure it in position. The number of the radially disposed channels may be varied as desired, and in each channel is a block x, each block being provided with a screw-threaded stud 6, as described, which on the lower end thereof has secured to it a beveled pinion 8, the lower end of the studs being stepped in a ring 9 extending around the inner end of the hub v and properly fixed thereon. The V-shaped projections w are turned off substantially flush with the sides of the blocks x, and a circular plate 10 is fixed thereto by screws, or otherwise, thus closing the open side of the channels in which the bocks x move, and providing a bearing for all sides of these blocks, as well as serving to keep out the dust.

This method of applying frictional resistance to the brake-drum is extremely powerful and possesses the advantage of permitting the resistance to be applied very easily and to any desired degree, and permitting the removal of the hand of the operator from the brake-operating lever after the brake has once been set, since it is impossible for the brake to back off. Furthermore, it provides means for radially adjusting the blocks for wear with great accuracy that is to say in taking up the blocks for wear, if it is found that certain of them have worn more than others, this extra wear may be compensated for in the adjustment by disengaging the circular rack from the pinions 8 after having first set the brake very slightly, then screwing out each block x into contact with the flange b after which, if the rack be replaced, the oscillation thereof in the usual manner will cause all of the blocks to come to a bearing at the same moment against the flange b. If all of the blocks wear uniformly, compensation for the wear thereof may be effected by shifting the bolts 3 to the extra holes 12 provided for their reception in the rack y. It will be observed furthermore, that in this brake construction a degree of movement necessary to apply it or throw it out of action is so very slight that extremely close fits, for a brake mechanism, are possible and only an extremely limited area of bearing surface would ever be exposed to the action of dust, the flanged brake-drum and the circular plate f constituting a substantially tight cylindrical casing for the internal brake mechanism.

What I claim, is:—

1. A double brake mechanism comprising a cylindrical casing consisting of a rotatable drum and a flange thereon, and a disk-like stationary member, an external brake mechanism comprising a band encircling the flange on said drum, and means on said stationary member to effect the constriction of said band on the flange of said drum, in combination with an internal brake mechanism comprising radially movable blocks located in channels on said stationary member, screw-threaded studs extending into each block, a circular rack rotatably supported on said stationary member, and beveled pinions on said studs meshing with said rack, together with means operable from a point outside of said stationary member to rotate said rack to effect the movement of said blocks against and away from the inner surface of said flange.

2. A brake mechanism, the combination with a flange member, a brake-band, means for moving the band into engagement with the flange member, said means including a shaft, a face-cam on the shaft, a cross-piece engaging the said cam, and means engaging the cross-piece for adjusting the same and causing the cross-piece to have a square bearing on the face-cam, as described.

JOSEPH H. WESSON.

Witnesses:
K. I. CLEMONS,
HARRY W. BOWEN.